Nov. 26, 1963 G. C. IRWIN 3,112,372
TELEPHONE MARKER TRANSLATING SYSTEM
Filed Oct. 3, 1960
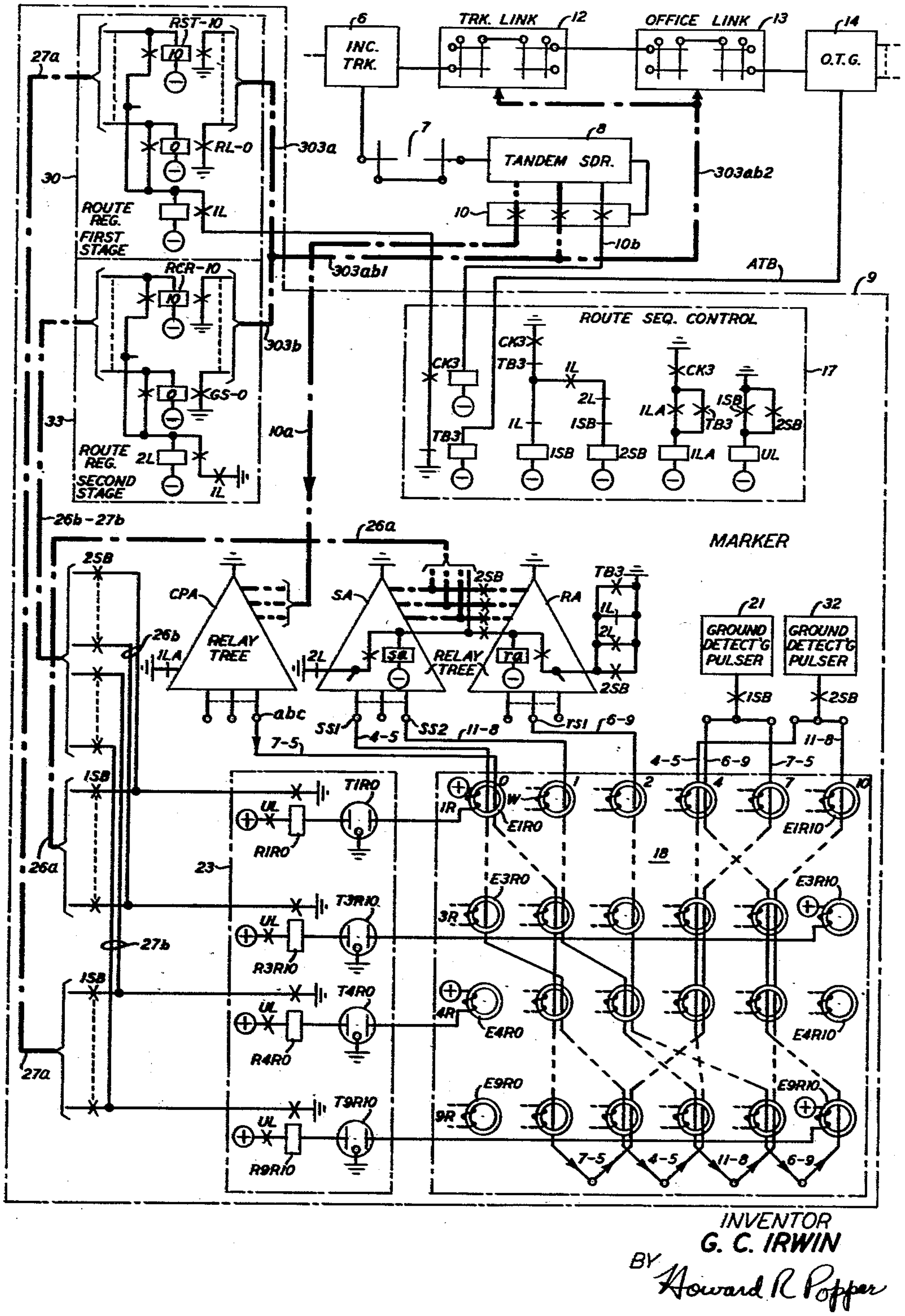
INVENTOR
G. C. IRWIN
BY Howard R Popper
ATTORNEY 3,112,372

TELEPHONE MARKER TRANSLATING SYSTEM

Gordon C. Irwin, Fair Haven, N.J., assignor to Bell Telephone Laboratories, Incorporated, New York, N.Y., a corporation of New York Filed Oct. 3, 1960, Ser. No. 59,960
11 Claims. (Cl. 179—18)

This invention relates to automatic telephone switching systems and more particularly to apparatus which furnishes instructions for routing a call to a particular destination.

The automatic routing of a telephone call requires that information be provided to operate switches in the transmission path between the calling and called subscriber. When a calling subscriber makes a call to a subscriber located beyond the local switching area of his home office, the call may be routed from the originating local office to a tandem switching center and thence over a tandem office-selected trunk route to the local office of the called subscriber. Information for the initial operation of these switches is obtained by translating the dialed number. However, the particular route selected as a result of the translation may not be available because of already existing traffic, and it is desirable that the switching apparatus automatically continue to seek alternate routes until an idle route has been found which will achieve the desired connection. This selecting operation is known as route advancing.

In the tandem switching office of the crossbar type such as the one described in B. McKim et al. Patent 2,564,441, issued August 14, 1951, a multicontact, initial-route relay is selected by translating the office code portion of the dialed number. Cross-connections from the contacts of this relay to the windings of marker work-relays control the selection, test and operation of the switches necessary to complete a transmission path between calling and called subscribers. One contact of this relay is wired to provide an operating path toward the winding of a further multicontact (route advance) relay whose contact cross-connections provide information for controlling the selection of an advance route. This operating path is enabled only in the event that busy indications are obtained from all trunks in the initially selected group.

The fourteen or more items of routing information typically required to be furnished by the cross-connections on the contact of the route relays are made up of instructions for controlling outpulsing by the tandem senders, instructions for controlling the selection of a trunk group outgoing to the called office, instructions for controlling call charging by the incoming (originating) trunk, traffic measurements ("peg count") instructions and instructions for reaching a route advance relay in case all of the trunks in the group designated by the initial route relay are busy. As noted above, each such route advance relay is reached by a conductive path extending from a contact on an initial route relay to the winding of the appropriate advance relay.

Because of changes in traffic patterns, it is from time to time required that the preference or order in which alternate routes are selected be adjusted. From time to time it also becomes necessary to update the elements of routing data describing the individual routes. It is extremely desirable that such adjustments and updating be capable of being readily made. In the aforementioned relay systems, altering the many "wired-in" cross-connections to update routing information is an expensive and time-consuring operation.

It is accordingly an object of the present invention to provide a new and efficient system of telephone call routing control.

It is another object of the present invention to provide a routing control translator exhibiting readily alterable translation characteristics.

It is a further object of the present invention to provide a routing control translator capable of rapid operation with a minimum number of information storage elements.

In accordance with the principles of the present invention, in one illustrative embodiment thereof, a sender, having registered a transmitted code, seizes a switch-controlling marker containing a code point access circuit. The access circuit translates the transmitted code to select a primary path through an array of $m$ information storage elements, which number $m$ is advantageously smaller than the number $a1+a2$ of information units required to complete the selection and control of a telephone switching route between calling and called subscribers. The selected primary path activates $a1+x$ storage elements corresponding, respectively, to $a1$ units of the required routing information and $x$ units of secondary access address information. The $a1$ and $x$ information is entered in respective registers and the information storage array returned to normal. The $x$ information units are thereupon enabled to select a secondary path through the array to activate $a2$ storage elements corresponding to the remaining $a2$ units of routing information appropriate to the aforementioned transmitted code. The marker tests the designated route and when the designated route is already carrying traffic, the marker reuses the aforederived $x$ information units to select a new primary path through the storage element array. The new primary path again provides $a1$ units of new routing information for the advance route as well as $x$ units corresponding to a new address of a secondary access path through the array. Should the second designated route be busy the marker reuses the new $x$ information units obtained from this second primary access path in the same manner as it initially used the prior $x$ information from the first primary access path. Operation continues in this manner until an idle route is found or until a prearranged number of route advances have been tried.

Accordingly, it is a feature of the present invention that an automatic telephone system switch controlling marker include a route translating array, access paths through the array being obtained initially by means of the dialed code and subsequently by means of access address designations furnished by outputs associated with the initially selected path, the same address designation being appropriate both for obtaining access to complete the description of the instant route as well as for obtaining access for initiating the description of an advance route.

It is another feature of the present invention that information for obtaining access to alternate groups of trunks be obtained from a route translator by redesignating to the translator the translator-provided address of the priorly-used trunk access information.

Another feature is translator means providing common control of a telephone call routing register so that individual wiring is not needed between the circuits designated by a called code to specify an initial arrangement of the routing register and the circuits for specifying appropriate advanced arrangements of the routing register.

It is an aspect of one illustrative embodiment of the present invention that a telephone marker route translator process a called code by providing as many sequences of telephone call routing instructions as are required to obtain an idle communications path, only for alternate ones of which instruction sequences the translator need provide an address designation.

The foregoing and other objects and features of the present invention may become more apparent by referring now to the drawing, the single FIGURE of which depicts in schematic form an illustrative embodiment of a tandem telephone switching office.

A call incoming to a crossbar tandem office arrives on an incoming trunk, such as trunk 6, and as described in Patent 2,564,441, seizes via link 7 an idle tandem sender 8 and enters therein the digits of the called office code. When the tandem switching office is arranged for processing dialed area codes, the area code, in addition to the office code, advantageously may be entered in sender 8. When sender 8 has registered the office code, or the area and office code, it engages a switch operating marker 9 by means of a marker connector 10. The connector 10 closes leads in cable **10*a* between the marker 9 and the tandem sender 8 for the purpose of transferring to the marker the digits of the called office code. The marker connector 10 also closes leads (not shown) between the sender and the marker for the purpose of furnishing information to the marker concerning the location of the calling trunk in the trunk link frame, and the class of service associated with the incoming trunk. The fact that the marker has been seized by a calling trunk is indicated to the marker by marker connector 10 closing lead 10*b***.

The marker 9, as will be hereinafter more fully described, causes the digits received over the leads of cable **10*a* to be translated into a routing code for the selection of an appropriate idle outgoing trunk group 14, for the operation of trunk link and office link switches 12 and 13 to connect incoming trunk 6 to an idle outgoing trunk in group 14, and for the transmission by sender 8 over the communications channel 6—12—13—14 of signals to the called subscriber's office (not shown). The sequence of operations performed by the marker in accomplishing the routing translation is governed by marker sequence control circuit 17 which is activated by sender 8 completing a ground circuit path to lead 10*b* upon the seizure of marker 9**.

The digits of the called office code are applied over the leads of cable **10*a* to code point access circuit CPA, which access circuit advantageously may comprise any of the well-known forms of relay trees among which are those noted in Patent 2,564,444 and those described in the Design of Switching Circuits by W. Keister, A. E. Ritchie and S. H. Washburn at chapter 4. Among these available types of relay trees are ones which apply an operating ground to one of a number of output points in response to an input code using any of the 1-out-of-10, 2-out-of-5, etc. forms of digit representation. The particular type of digit utilization selected for access circuit CPA is of course chosen to be compatible with the characteristics of sender 8. Assuming that only three digits are involved, such a relay tree is capable of selecting a maximum of 1,000 distinctive code points. In standard telephone practice, however, 0 and 1 are not ordinarily assigned to either the A or B digits of an office code, and accordingly, there may be as few as 640 such code points. In either event, a sufficient number of leads in cable 10*a*, dependent upon the type of digit representation used, will be grounded by sender 8 to operate three corresponding groups of relays in code point access circuit CPA. Access to the three groups of relays is schematically indicated by the three horizontal subcables branching from cable 10*a* and entering the right hand side of circuit CPA. The windings (not shown) of the operated ones of the three groups of relays receive locking ground from the marker over a back contact 1LA** at the left-hand side of circuit CPA.

Of the many hundreds of possible code points selectable to be grounded by circuit CPA and schematically indicated at the base of circuit CPA, circuit connections will be explicitly shown only to code point *abc* thereby simplifying the drawing. For example, a particular office code ABC transmitted from sender 8 to circuit CPA will cause the operation of the three groups of relays in circuit CPA to extend an operating ground, schematically indicated at the apex of circuit CPA, to the corresponding code point designated *abc*. Connected to code point *abc* is a conductor 7–5, which conductor traverses the storage element E–R– of information storage array 18 in a distinctive pattern for the selection and control of an appropriate switching route between incoming trunk 6 and an idle outgoing trunk 14. Similarly, each of the other code points has a conductor threading array 18 corresponding to a respective ABC office code. Jumper 7–5 is so designated 7–5 because it threads a "0" and a "7" ring in row 1R and a "1" and a "4" ring in row 3R, the dash in 7–5 corresponding to a pair of threaded elements in row 2R (not shown).

Each of the E–R– elements in array 18 is advantageously in the form of magnetic ring such as the type disclosed in T. L. Dimond Patent 2,614,176. Each row of these elements is arranged so that no more than two elements per row need be activated to provide a combinatorial output code indicative of a corresponding aspect of the routing information. For example, nine such rows of E–R– elements may advantageously be included in array 18 to provide, in response to the selection of any of the conductors connected to code point access circuit CPA, six items of the routing information, and three items of address information to be hereinafter more fully discussed.

Among the six rows 4R through 9R (only the first and last of whose rings are shown in detail) two rows are threaded by conductor 7–5 in combinatorial, two-digit form to provide, respectively, the number designation of an office frame pair having trunk groups to the called party's office and a number designation of the level on the office frame at which these trunk groups appear. Another of the rows 4R through 9R is threaded by jumper 7–5 to provide sender 8 with class of call information, i.e. a coded description of the type of outpulsing (dial, revertive, multifrequency, etc.) that sender 8 must be arranged to transmit. Another of the rows 4R through 9R is threaded by jumper 7–5 to provide sender 8 with an office brush number which is required by sender 8 for the control of revertive pulsing between the tandem office and the called party's office. Another of the rows 4R through 9R threaded by jumper 7–5 provides sender 8 with special information such as the type of outgoing trunk serving the called party's office, i.e. whether it is a high class, two-way, guarded trunk in which case the sender 8 is immediately instructed to release marker 9 via connector 10 until all the digits of the called party's number (not merely the office code portion) have been registered in sender 8 from the incoming trunk 6. The release of marker 9 in this manner prevents "tying up" expensive two-way trunks during the finite interval in which sender 8 is registering the remaining digits of the called party's number. Sender 8, as noted above, includes means for registering the trial number. Accordingly, when all of the digits of the called number have been registered in sender 8, the marker 9 is reseized and proceeds with the call.

Before discussing the items of address information provided by the first three rows 1R–3R it may be well to trace the path of jumper 7–5 from code point *abc* downward into array 18 through element E1R0, an element E2R– in row 2 (not shown), elements E3R1, E4R1 and elements E5R–, E6R–, E7R– and E8R– in rows 4 through 8 (not shown) and element E9R1. Jumper 7–5 continues up through array 18 (in opposite sense to that in which it linked each of the aforementioned elements) through element E9R2, an E–R– element not threaded before by jumper 7–5 in each of rows 8R through 5R, elements E4R4, E3R4, an E2R– element and E1R7 element to ground pulse detector 21 through make contact 1SB.

The winding of relay 1SB is located in sequence control circuit 17 and is operated over a circuit extending from negative battery, winding of relay 1SB, back contact of relay 1L, back contact of relay TB3 and make contact of relay CK3 to ground. As was indicated above, relay CK3 is operated over path 10*b* at the same time that marker 9 is seized by sender 8. Operation of relay 1SB connects pulser 21 to the jumpers leading from the code points of circuit CPA and connects the output leads of gas tube circuit 23 to cables 26*a* and 27*a*.

Ground detecting pulser 21 is advantageously of the type disclosed in the above-noted Dimond Patent 2,614,-176 and operates to apply a high amplitude current pulse to jumper 7–5 when it is provided with a ground path in circuit CPA. Energization of jumper 7–5 activates each of the aforementioned E–R– elements of array 18 inducing a high voltage surge in the corresponding output winding W thereof. Each output winding W is cabled to an initiating electrode of a respective gaseous discharge tube T–R– in output circuit 23. For the sake of simplicity, no more than one tube is explicitly shown in any row, it being understood, however, that there is a corresponding tube T–R– in circuit 23 for each of the E–R– elements of array 18. For example, in circuit 23, only tubes T1R0, T3R10, T4R0 and T9R10 are explicitly shown, the tubes bearing designations intermediate to those just mentioned being associated with a respective E–R– element of array 18 in the same manner as the explicitly shown tubes.

When jumper 7–5 is selected by access circuit CPA and energized by pulser 21, discharge tube T1R0, as well as each of the above-mentioned tubes of circuit 23 that are not explicitly shown and that correspond to the respective E–R– elements threaded by jumper 7–5, will be rendered conductive and provide an operating path for an associated R–R– relay. The operating path for the R–R– relays is traceable from positive battery, a respective contact of relay UL, the respective winding R–R–, and a holding electrode of the respective R–R– gas discharge tube to ground. Relay UL is operated by relay 1SB of sequence control circuit 17, its operating path being traceable from negative battery, winding UL, and make contact 1SB to ground.

The operation of the make contacts R–R– associated with the discharge tubes corresponding to the fourth through ninth rows of E–R– elements of array 18 extends operating grounds to corresponding make contacts 1SB and respective conductors in cable 27. The operating grounds applied to register 30 operate corresponding work relays therein for controlling trunk links and office links appropriate to the extension of a switching connection from trunk 6.

Among the items of information which may advantageously be obtained from the rows of rings 4R and 9R is an indication of the class of call or type of outpulsing required to operate the incoming switches of the terminating office and other special information such as whether a two-way trunk connects the tandem office with the office serving the called number. In the typical operation of the crossbar tandem switching system described in the above-mentioned McKim et al. patent, the tandem sender 8 will seize marker 9 as soon as the three digits of the called office code have been registered in sender 8, that is, before the calling subscriber has finished dialing the remaining digits of the called party's number. This is to enable the switching system controlled by the marker to begin the establishment of a switching path while the number is still being registered in sender 8. However, when the switching path will include a two-way trunk between the tandem office and the called office, it is not desirable for the marker to seize this two-way trunk before the sender has completely registered all of the digits of the called party's number.

Accordingly, one of the work relays in routing register 30, which work relay is operated by a special information two-way trunk output indication from circuit 23, will deliver over cables 303*a* and 303*ab*1 a controlling signal to the sender 8 which will enable the sender 8 to operate connector 10 to release marker 9 until sender 8 has registered all digits of the called office code. Circuits internal to sender 8 for operating a connector to release a marker until the sender has registered all of the digits of the called office code are well known and are described in detail in the above-mentioned McKim patent. On the other hand, where a two-way trunk is not involved, the work relays set up in register 30 may advantageously proceed to select the office frame upon which a trunk outgoing to the called office is located, the trunk level of an appropriate group of outgoing trunks, an outpulser appropriate to the type of office serving the called party and any other switching equipment whose operation is advantageously begun in the earliest possible stage of the selection and control operation.

The ground paths provided by the make contacts of the three groups of R1R0 through R1R10, R2R0 through R2R10, and R3R0 through R3R10 relays are extended through make contacts 1SB and continued over three corresponding subgroups of conductors in cable 26*a* to secondary access circuit SA where three corresponding groups of access relays are energized. Access circuit SA is a relay tree access circuit such as the type described above in the description of circuit CPA.

Within the access circuit SA the locking path for only one relay of one of the three groups of selecting relays is shown, the locking paths for the remaining relays being similar. When an operating ground is applied to a conductor in cable 26*a* a selecting relay, such as relay *sa*, will be operated, its operating path extending from the negative 48-volt supply, the winding *sa*, and the operating ground provided over one of the conductors in cable 26*a*. The relay *sa*, upon operating, locks over its make contact to the ground bus which in turn receives locking ground over back contact 2L.

Among the groups of work relays in register 30, the group of trunk level relays RL– (of which only relay RL–0 is shown) will be operated corresponding to the provision of an operating ground by operated relays R4R1 and R4R4 in circuit 23. There are, advantageously, as many RL– relays as there are rings in the row, for example row 4R, of array 18 which row is the source of the trunk level information designated to circuit 30. Operation of relay RL–0 extends the operating ground over its make contact RL–0 to the winding of relay 1L causing relay 1L to operate. Relay 1L locks over a circuit including its make contact 1L, the locking path extending from negative battery in register 30, winding 1L, make contact 1L, make contact CK3, and back contact TB3 to ground. Operation of relay 1L indicates that the information providable by the energization of jumper 7–5 has been entered in routing register 30.

Operation of relay 1L causes the relase of relay 1SB in circuit 17 by opening break contact 1L in the 1SB operating path, and make contact 1L transfers the circuit ground to the winding of relay 2SB. Relay 2SB operates, its operating path extending from negative battery, winding 2SB, back contact 1SB, back contact 2L, front contact 1L, back contact TB3 and front contact CK3 to ground. Back contact 1SB is included in the operating path of relay 2SB to prevent relay 2SB from operating until relay 1SB has actually released.

The three groups of access relays of circuit SA, operated over the grounds provided in cable 26*a*, extend an operating ground from the apex of access circuit SA to a particular one of the terminals at the base circuit SA in accordance with the particular ones of the access relays that are operated. For example, the output code obtained from rows 1R and 3R of array 18 is 7–5, and SA, in response to the operating of its 7–5 selecting relays, grounds terminal *ss*1. Connected to terminal *ss*1 is a second string jumper 4–5 so designated because it threads rings 0 and 4 in row 1R and rings 1 and 4 in row 3R of array 18. In addition, jumper 4–5 threads two rings in each of the rows 4R through 9R. Jumper 4–5 extends an operating ground from terminal *ss*1 through make contacts 2SB to ground detecting pulser 32 which is of the same type as pulser 21 and which functions to apply a high amplitude current pulse to jumper 4–5 energizing the rings threaded by jumper 4–5, triggering the associated R–R– tubes and operating the relays R–R– associated with the triggered tubes. Accordingly, ground will be provided via make contacts of the associated R–R– relays to the corresponding conductors in cables 26*b* and 27*b* which operating grounds will be extending by a corresponding make contact 2SB and cables 26*b* and 27*b* to routing register 33.

While the firing of second string jumper 4–5 occurs, the three groups of 2SB make contacts between circuits SA and RA are operated, transferring the above-described locking ground from each of the operated ones of the three groups of selecting relays of circuits SA to corresponding relays in access circuit RA. For example, relay *ra* is operated by receiving, over a 2SB contact the locking ground present at the winding of the operated *sa* relay. Relay *ra* locks over its make contact to the ground provided by the 2SB contact at the right of circuit RA.

Routing register 33 also contains groups of work relays for completing the selection and control of switching circuits to extend a transmission path from incoming trunk 6 to the called subscriber. Typically to be found among such work relays are relays which initiate the hunting for an idle trunk among the group of trunks (designated by the relays of register 30) beginning with a given trunk and ending at a given trunk and relays for zone registration. The work relays so operated in the routing register 33 are advantageously those relays whose operation may be suitably postponed in the route selection and control operation. Among these work relays in register 33 operated by the energization of second string jumper 4–5 is a group of relays GS– which initiate trunk hunting among the designated group of trunks to the called office. Of the group of GS– relays only relay GS–0 is explicity shown it being understood however, that there are advantageously as many such GS– relays as there are rings in a corresponding row, such as row 9R, of array 18. Operation of relay GS–0 continues an operating ground extended over the contacts of the other operated work relays of register 33 to the winding of relay 2L. Operation of relay 2L indicates that all of the information providable by the energization of jumper 4–5 has been entered in routing register 33. Relay 2L operates and locks and provides locking ground for each of the operated ones of the work relays in register 33.

Relay 2L also causes relay 2SB in circuit 17 to release by breaking the locking ground provided over break contact 2L. Release of relay 2SB breaks the operating ground provided over its make contact SB for relay 2L and all the tubes R–R– throughout circuit 23 fired by the energization of jumper 4–5 are extinguished releasing their associated R–R– relays.

Assuming that the switching route determined by the operation of the work relays in each of registers 30 and 33 has found an idle outgoing trunk in group 14, the tandem sender will be controlled via cable 303 to release marker 9 by opening the contacts of connector 10. Opening the contacts of connector 10 breaks the operating ground provided by sender 8 for ring relay CK3 in relay sequence control circuit 17. Release of relay CK3 opens the locking ground for relay 1L causing it, as well as all of the operated relays in register 30, to release. Release of relay 1L in turn breaks the operating ground for relay 2L and the operated ones of the work relays of register 33. The circuits of the marker thus far described are then returned to normal, allowing another call to be processed.

On the other hand, if none of the trunks in the group of trunks 14 designated by the GS– relays of register 33 are idle, the last trunk of the group tested will provide an operating path over lead ATB to relay TB3. Relay TB3 in operating will break the locking ground for relays 1L and the operated ones of the work relays in register 30 and relay 2L and the operated ones of the work relays of register 33. Relay TB3 will also break the operating ground for relay 2SB causing relay 2SB to release. The release of the operated ones of the work relays in registers 30 and 33 also causes the selected group of trunks which furnish an operating ground over lead ATB to relay TB3 to be released, and TB3 is thereafter released.

Release of relay TB3 reestablishes over its now-normal break contact TB3 the operating ground for relay 1SB causing relay 1SB to reoperate. The marker is now ready to designate a new group of trunks to test for an idle transmission path to the called subscriber. The designation of the advance route is provided by the operated ones of the three groups of access relays of route advance access circuit RA over the three corresponding grous of make contacts of relay 2SB, which relays were operated during the firing of the second string jumper 4–5. Access circuit RA is identical with access circuit SA and the closing of the three groups of make contacts of relay 2SB operates three groups of access relays in circuit RA corresponding to the groups of operated access relays in circuit SA. The three groups of access relays in circuit RA receive operating battery from 48-volt source and locking ground over make contact 2SB.

When relay 2L operated in response to the firing of the second string jumper 4–5, relay 2SB in circuit 17 was released, but the locking ground for access circuit RA was maintained by make contact 2L which is in parallel with and which is operated prior to the release of contact 2SB. When the first group of trunks selected by the operation of the work relays in registers 30 and 33 are all busy and relay TB3 in sequence control circuit 17 is energized, the operation of relay TB3 causes relay 2L and 1L to be released, but make contact TB3 maintains the locking ground for access RA. When the selected group of trunks is released by the release of the work relays in registers 30 and 33 due to the release of relays 1L and 2L, the break contact of relay 1L maintains the locking ground for circuit RA.

Accordingly, after the trunks of the initially selected route have been found busy and have been released, access circuit RA retains the designation priorly transferred to it by second string access circuit SA. The three groups of operated access relays in circuit RA accordingly extend an operating ground from the apex of circuit RA to one of the 600 terminals at the base of circuit RA, such as *rs*1. Connected to *rs* is a jumper designated 6–9 which threads the E–R– elements of array 18 in a pattern appropriate to operate T–R– tubes, R–R– relays, and work relays of routing register 30 in similar manner to that in which jumper 7–5 was operated during the selection of the initial route. However, the particular work relays energized by jumper 6–9 will correspond to a different route.

Jumper 6–9 similarly threads rings in row 1R, 2R and 3R to provide a designation of a second string jumper for the first advance route. This designation will be provided over the three groups of make contacts of relay 1SB and cable 26*a* to second string access circuit SA and will be locked into circuit SA; the locking path for the access relays in circuit SA extending from the 48-volt source, the windings of the operated ones of the access relays in circuit SA, back contact 2L, and ground.

It is seen that the particular designation furnished to circuit SA by the firing of route advance jumper 6–9 is the number 6–9 furnishing SA. The designation 6–9 operates the access circuits of relay SA to extend the ground to one of the 600 points at the right of circuit SA rather than point *ss*1 for example *ss*2.

Jumper 11–8 is connected to terminal *ss*2 and threads array 18 to operate T–R– tubes and R–R– relays and work relays of register 33 appropriate to the selection and control of a second route. As was the case in the selection of the first route either an idle trunk will be found, in which case the sender will be instructed to release the marker, or all trunks will be found busy and an ATB lead from the selected group of trunks will be provided with an operating ground to reactivate relay TB3 in sequence control circuit 17. In the latter case, a second advance route will be selected in similar manner to that in which the first advance route was selected.

In summary, it is seen that the digits of a called office code are processed by the hereindescribed marker translating system in such manner that the office code provides an initial access to a translating array. The translating array in response thereto provides two types of output information, each of which is stored: one for setting up trunk seizure and outpulsing instructions in the route register, and the other for obtaining a secondary access to the translator for completing the trunk seizure and outpulsing instructions designated to the route register. While the trunk seizure and outpulsing instructions are being completed the same information used for obtaining the secondary access is transferred to a route advance access circuit, and if all the trunks of the group designated to the route register are busy, the route advance access circuit is enabled to provide a new "initial" access to the translating array. The translator in response to the activation of the new "initial" access provides new "secondary" access and new trunk seizure and outpulsing instructions. Translator efficiency is maximized because translator elements need not be arranged for access designating every time the translator is consulted and may be used instead to provide additional units of routing information.

It is to be understood that the above-described arrangements are illustrative of the application of the principles of the invention. Numerous other arrangements may be devised by those skilled in the art without departing from the spirit and scope of the invention.

What is claimed is:

1. An automatic telephone system for establishing connections among a plurality of switching routes comprising means for registering a called code, means associated with said registering means for translating said code to obtain preliminary switching route instructions, means for arranging said translating means to translate a portion of said preliminary route instructions to obtain supplementary instructions for said switching route, means for testing the switching route described by said preliminary and said supplementary switching route instructions, and means responsive to a busy indication obtained by said testing means for rearranging said translating means in accordance with said portion of said instructions.

2. In an automatic telephone switching system, a call routing register, a translator having outputs for operating said register, first, second and third input access means associated with said translator, means for entering a called code in said first access means, means controlled by said translator outputs for entering a translated portion of said called code in said second access means, and switching means controlled by said routing register for entering said translated portion of said called code in said third access means.

3. An automatic telephone switching system in accordance with claim 2, said switching means further comprising means for blocking said first access means when said translated portion of said called code is entered in said third access means.

4. An automatic telephone switching system marker circuit comprising a translator field, first, second and third access circuits associated with said field, means for entering a coded address in said first access circuit, means for activating said first access circuit, means responsive to said field when activated by said first access circuit to enter a field-designated address in said second access circuit, means for activating said second access circuit, a plurality of trunk circuits capable of exhibiting busy and idle states, means coupled to said field and responsive to the activation of said first and said second access circuits for testing a field-designated one of said trunk circuits, means for transferring said field-designated address from said second access circuit to said third access circuit, means responsive to the busy condition of said field-designated trunk for actuating said third access circuit, means responsive to said field when actuated by said third access circuit for entering the field-designated address in said second access circuit and means including said above-mentioned means for reactuating said second access circuit.

5. In an automatic telephone switching system, call routing means, a translator field for operating said call routing means, means operated in accordance with a first called code for designating a primary translation path through said translator field, said translation path providing a secondary designation code, means operated by said primary path and said secondary designation code for activating said call routing means, route advance selection means, and means for transferring said secondary designation code to said route advance selection means.

6. In an automatic telephone switching system according to claim 5, the combination wherein said route advance selection means includes means responsive to said secondary designation code for designating a tertiary translation path through said translator field.

7. In a telephone switching controlling marker circuit an array of circuit energizing elements, a plurality of input paths linking said array, means for selecting one of said input paths to activate a first pattern of said elements, means responsive to said activated pattern for designating another of said input paths to activate a second pattern of said elements, a plurality of telephone trunk groups, means responsive to said first and said second patterns of said elements for testing a particular trunk group corresponding to said first and second patterns, means for selecting a third of said input paths, and means controlled by said particular trunk group for activating said third input path.

8. In an automatic telephone switching system marker, a routing translator field; a plurality of first, second and third groups of input paths to said field; a routing register having first and second stages; first sequence means for associating a first output portion of said field with said first stage of said register and for associating a second output portion of said field with said second group of input paths; means for enabling one path of said first group of paths to enter field-translated information in said first stage and to designate a particular path in said second group of paths; second sequence means for associating both said output portions of said field with said second stage; means for enabling said second group particular path to enter field-translated information in said second stage; means thereafter controlled by said routing register for designating a particular path in said third group of paths; and means for replacing the information in said routing register stages with field-translated information from said particular path in said third group of paths.

9. In an automatic telephone switching system for controlling the routing of a telephone call along an idle one of a plurality of switching paths, a call routing translator for obtaining the designation of one of said switching paths, a first access circuit for seizing said translator according to a called code, a second access circuit controlled by said translator for seizing said translator according to a translated portion of said called code, and means actuated by the busy condition of a designated one of said switching paths for reseizing said translator including a third access circuit for seizing said translator according to said translated portion of said called code and means for recontrolling said second access circuit to seize said translator.

10. In an automatic telephone switching system according to claim 9, the combination wherein said second and said third access circuits include registering means, and wherein said means for reseizing said translator includes means for connecting together said registering means for transferring said translated portion of said called code from said second to said third access circuit.

11. In an automatic telephone switching system according to claim 10, the combination wherein said means for recontrolling said second access circuit comprises means for entering in said second access circuit registering means a portion of said called code retranslated when said translator is seized by said third access circuit.

References Cited in the file of this patent

UNITED STATES PATENTS

| | | |
|---|---|---|
| 2,824,910 | Scowcroft | Feb. 25, 1958 |
| 2,897,282 | Hopkins | July 28, 1959 |
| 2,918,533 | Leonard et al. | Dec. 22, 1959 |
| 2,928,903 | Bellamy et al. | Mar. 15, 1960 |
| 2,932,695 | Gomorel | Apr. 12, 1960 |